United States Patent [19]

Ell

[11] 4,087,163

[45] May 2, 1978

[54] PHOTOGRAPHIC PROCESSING FLUID APPLICATOR

[75] Inventor: Robert J. Ell, Malden, Mass.

[73] Assignee: Polaroid Corporation, Cambridge, Mass.

[21] Appl. No.: 686,586

[22] Filed: May 14, 1976

Related U.S. Application Data

[63] Continuation-in-part of Ser. No. 525,347, Nov. 20, 1974, abandoned, which is a continuation-in-part of Ser. No. 418,655, Nov. 23, 1973, abandoned.

[51] Int. Cl.² ............................................. G03C 11/00
[52] U.S. Cl. ..................................... 352/130; 354/317
[58] Field of Search ........................ 352/130; 220/359; 206/498; 354/83, 275, 317

[56] References Cited

U.S. PATENT DOCUMENTS

3,547,305  12/1970  Khoury .................................. 220/359
3,812,515   5/1974  Cook ...................................... 352/130

Primary Examiner—Monroe H. Hayes
Attorney, Agent, or Firm—Karl H. Hormann

[57] ABSTRACT

A container for photographic processing composition being releasably sealed by a novel seal provided by a flexible web releasably bonded to a plurality of lips surrounding an aperture in the container. The novel seal is such that, owing to its relatively small area of bonding between the web and the lips, it assures proper separation of the web from the lips when a pulling force is exerted on it. The seal formed by the bonding of the web to the plurality of lips is such that it withstands rupture that might result from excessive internal pressure in the composition when subjected to shock forces.

6 Claims, 10 Drawing Figures

PHOTOGRAPHIC PROCESSING FLUID APPLICATOR

BACKGROUND OF THE INVENTION

This is a continuation-in-part of U.S. application Ser. No. 525,347, filed Nov. 20, 1974, being a continuation-in-part of the U.S. application Ser. No. 418,655, filed Nov. 23, 1973, both abandoned.

The present invention relates to photograhic apparatus and, more particularly, to a processing fluid receptacle of an applicator for treating a strip of photographic film material. The applicator is for especial use in a photographic film cassette of the kind allowing processing of latent images recorded on the film into viewable condition without requiring removal of the film from the cassette during the processing operation.

DESCRIPTION OF THE PRIOR ART

Recently significant advances have been wrought in the field of motion picture photography by the proposal, as for instance described in U.S. Pat. Nos. 3,830,564, 3,778,140 and 3,772,975, of systems and apparatus which, instead of compelling the photographer to surrender his exposed film to remote processing facilities for processing, permit him to do the processing himself simply by activating a processing station mounted in the cassette housing the film and without removing the film from the cassette. In fact, the proposed systems are such that the film is exposed, processed and projected without ever having to be taken out of its cassette.

Processing is advantageously accomplished in an apparatus, such as a film projector, which, when the cassette is put into it senses the condition of the film, i.e. whether or not it has been processed and, if not, automatically subjects the film to processing by rendering the processing station provided in the cassette operative which causes the photosensitive emulsion of the film to be coated with a processing composition while the film is moved relative to the station.

In the cassette the film can be moved, for instance between two coplanarly mounted reels, along a path which includes the processing station. Activation of the processing station includes opening a container in which a processing composition is stored so that it may be deposited on the photosensitive emulsion as a coating of uniform thickness as the film moves by the processing station.

As shown in U.S. Pat. No. 3,830,564, the container in which the processing composition is stored is a receptacle provided in one of its surfaces with an opening which before release of the composition is releasably sealed by a flexible web. This web may be removed from its sealing relationship with the receptacle by a pulling force exerted on an extension of the web. The extension is coupled to the mechanism used for moving the film in such a manner that it can be pulled when processing is indicated.

It will be appreciated that it is of the utmost importance that the sealing web is effectively removed when desired. On the other hand the sealing bond between the receptacle and the web must be strong enough to withstand forces, such as shock, inadvertently arising, for instance when the cassette is accidentally dropped, that might result in rupturing of the seal and cause spoiling of the film by spilled processing liquid. Since it is intended that the cassette never be opened or that the film remain in the cassette at all times, it is important that both criteria, i.e. effective deliberate openability of the receptacle on the one hand and a seal rupture-proof under any but deliberate forces, be met.

The prior art devices while by and large satisfactory, fail nevertheless to offer the desired predictability in both respects. Thus, it will be noted that, as shown in U.S. Pat. No. 3,830,564, the area of the bond is relatively large, the web being attached to the surface surrounding the dispensing aperture of the receptacle. While this kind of bonding offers reasonable assurance against rupture under shock, it may be too strong to permit proper removal of the web. The web may break instead or the mechanism acting on the extension of the web may become distorted, bent or otherwise rendered defective before the opening has been sufficiently uncovered to assure dispensing of the composition.

It is thus a general object of the invention to provide an improved container for photographic processing composition which is safe from rupturing inadvertently but easily opened by forces deliberately exerted on it.

Another object of the invention is directed to a container of the kind noted which has a releasable seal the strength of which is balanced on the one hand to prevent it from rupturing under accidentally arising forces and on the other hand assures proper opening when deliberately acted upon.

Another object of the invention is to provide for a photographic processing composition container having a releasably bonded seal incorporating a bonding area which while small in area is nevertheless strong and durable.

It is a further general object of the present invention to provide for an improved applicator for treating a strip of photographic film material without requiring its removal from a cassette within which it is movably mounted.

Yet another object relates to an improved photographic motion picture film cassette of the kind in which a film is exposed, processed, and projected without requiring removal from the cassette.

SUMMARY OF THE INVENTION

In the accomplishment of these and other objects the invention in one of its aspects proposes a container for photographic processing fluid comprising a hollow receptacle having an aperture in one of its surfaces; a plurality of lips upstanding from the one surface and surrounding the aperture, each lip having a planar upper surface, and a flexible web for releasably sealing the receptacle including a section releasably bonded to the upper surface of each lip, the section being provided with an extension for exerting a pulling force on the web so that the section may be peeled off the surface of the lips to cause gradual opening of the container.

In another embodiment the invention is directed to an applicator suited for depositing a layer in uniform thickness of a processing composition on a photographic film moving relative to the applicator, the applicator being provided with a selectively openable container in which the processing fluid is initially safely stored, but which may be intentionally opened by forces deliberately acting upon its seal. To this end the container is provided, in one of its surfaces, with an aperture which is surrounded by a plurality of lips upstanding from the surface and which have a planar upper surface to which a flexible web is releasably bonded. The web has an extension which is accessible from the outside of the applicator so that a pulling force may be exerted on it for peeling the web off the lips thus to open the aperture. The aperture faces a chamber provided with a nozzle, and the nozzle is directed towards the film for depositing the processing composition thereon.

In a more advanced embodiment the invention covers a motion picture film cassette of the kind that permits exposing, processing, and projecting a film movably mounted therein without requiring its removal from the cassette. The path of movement of the film, as for instance between supply and take-up reels, passes by a processing station which can selectively be rendered operative for developing latent images recorded on the film into a viewable condition. The processing station, in its essential parts, comprises a chamber having a nozzle therein which is directed towards the emulsion side of the film, or may be directed towards it, as the case may be. The chamber is in operative engagement with a container in which processing composition is stored but which may be released into the chamber and thence to the film by opening the container. For this purpose the container is provided with a novel seal covering an aperture opening into the chamber of the processing station. The aperture is surrounded by a plurality of upstanding lips each having a planar upper surface to which is releasably bonded a flexible sealing web. The web in turn is provided with an extension which is attached to a mechanism which by way of a selectively actuatable clutch device may be connected to means for moving the film along its path within the cassette, such as the supply reels and when so connected exerts a pulling force on the web when the film is moved and thus peels the web off the lips causing opening of the container and release of the fluid into the chamber of the processing station. Once the container has been opened further movement of the film may momentarily be interrupted to assure filling of the chamber sufficient to assure uninterrupted flow of the processing composition through the nozzle for coating the entire length of film.

BRIEF DESCRIPTION OF THE DRAWINGS

These and other objects are hereinafter described, by way of example, with reference to the appended drawings in which.

DETAILED DESCRIPTION OF THE INVENTION

A motion picture film cassette 10 (FIG. 1) comprises a housing preferably impervious to actinic radiation to prevent unwanted exposure of photographic film 12 contained therein. The housing is parallelepiped and has two opposing side walls 14 and 16, a forward wall 18, a rear wall 20, and opposing end walls 22 and 24. The film 12, being a motion picture film, is mounted within the cassette 10 for movement between a supply reel 26 on which it is initially coiled before its exposure in a camera (not shown) and a take-up reel 28 onto which it is wound during such exposure. Opposite ends of the film are fastened to the reels 26 and 28. Both reels 26 and 28 are appropriately journaled in a common plane within the cassette 10 as, e.g., on studs (not shown) protruding from one of the side walls 14 or 16. Suitably positioned apertures in the other side wall render driving hubs 30 and 32 of reels 26 and 28, respectively, accessible to drive means provided in a camera (not shown) or projector (not shown) for rotatably driving the reels 26 and 28 unidirectionally so that the film 12 may be subjected to such operations as, for instance, exposure, processing and projecting as well as winding, in a predetermined sequence. The film 12, in moving from one reel to the other by virtue of their rotation, is guided along a path including idler rolls 34, 36 and 38 rotatably mounted on side wall 16 through operating stations 40 and 42 provided in the cassette 10. At least one of the idler rolls, here 38, may be braked by engagement through an aperture (not shown) in side wall 14 with means mounted in the camera or projector for imparting a tension to the film appropriate for assuring motion of the film 12 at uniform linear speed.

Figure 1:
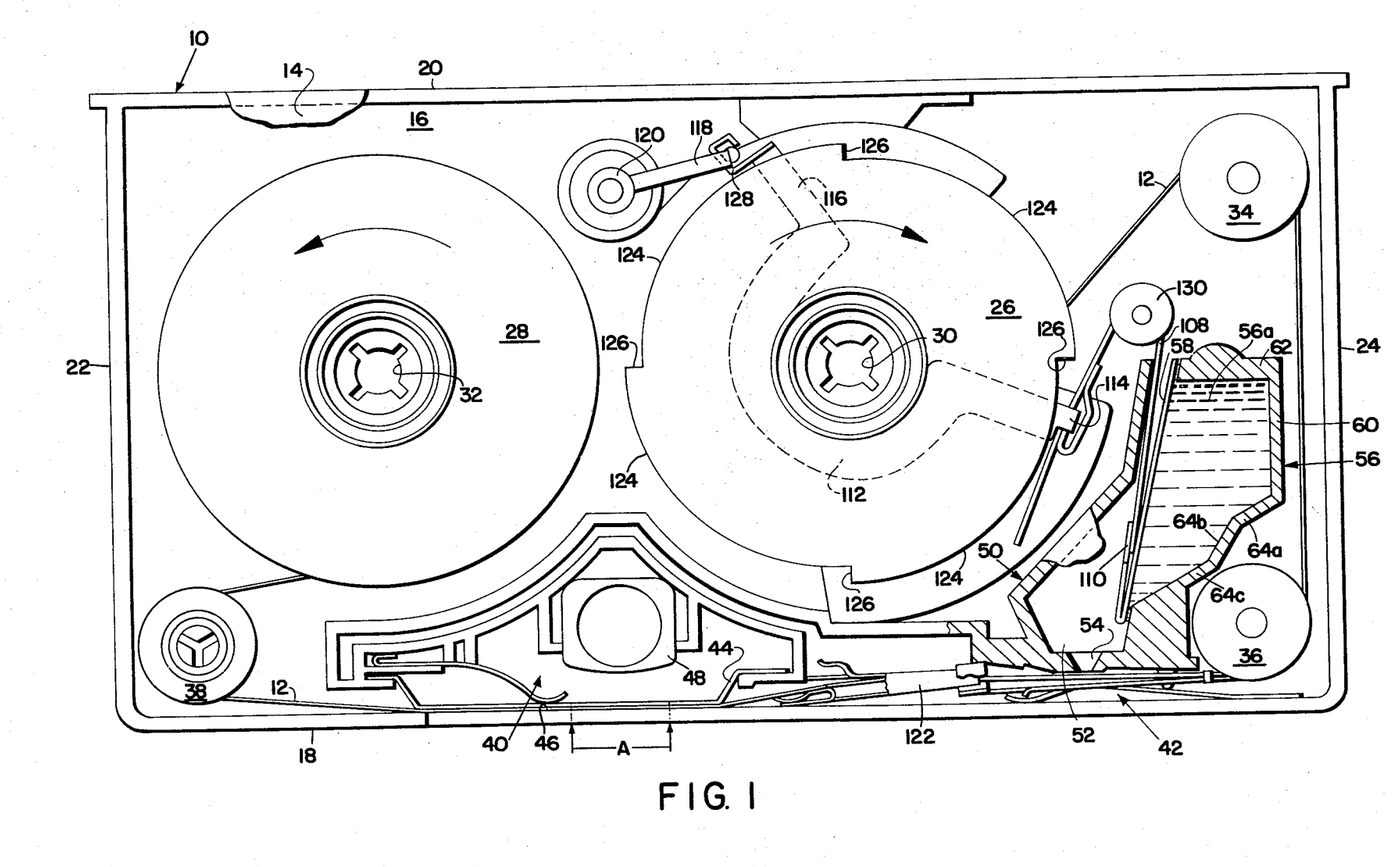
FIG. 1 is a planar view, with parts broken away for clarity, of a motion picture film cassette having a novel receptacle for processing fluid.

Operating station 40 serves two purposes. It functions as a film exposure station permitting incremental sections of the film 12 to be exposed to image bearing radiation as it is moved within a camera. To this end station 40 is provided with an aperture indicated as positioned in forward wall 18 within an area marked "A." The aperture, during exposure of the film, is in registry with the optical path of the taking lens of the camera. A spring loaded apertured pressure plate 44 and a cooperating guide surface 46 provided on the inner surface of forward wall 18 maintain the film at the focal point of the camera lens.

Station 40 also serves as a projecting station when the cassette 10 is mounted in a projector. Station 40 is provided with an optical prism 48 in registry with an aperture in one of the side walls 14 or 16 and the aperture in area "A" of forward wall 18. Light from a projection lamp (not shown) entering the prism 48 through the aperture in the side wall is refracted by the prism 48 and redirected through the film 12 and the aperture in wall 18 to project an image recorded on the film on a projection screen (not shown).

Operating station 42 is a film processing station at which latent images recorded on the film 12 can be developed without removing the film 12 from the cassette 10. Such development may be accomplished during a predetermined step in the operating sequence of a projector (not shown) into which the cassette 10 is loaded after the film 12 has been exposed. The projector may operate fully automatically and may be equipped with sensors which determine, once the cassette 10 is inserted into the projector, not only whether or no processing of the film 12 is required, but they also cause actuation of the processing station 42 before the projector is switched to a projecting mode. To this end, the sensors in the projector may be responsive to various means or conditions of the cassette 10. An example of such sensors has been described in U.S. Pat. No. 3,851,958, issued Dec. 3, 1974.

The processing station 42 comprises an applicator 50 suited for coating the light sensitized emulsion of the film 12 with processing fluid in a layer of uniform thickness. The applicator 50 has a chamber 52 mounted within the cassette 10 adjacent supply reel 26. A nozzle 54 in the chamber 52 is provided for depositing the processing fluid on the film 12. The chamber 52 may be filled with wicking material to assure uniform flow of the processing composition or fluid out of the nozzle 54 onto the film 12. Before release of the fluid into chamber 52 it is contained in a container 56 which is in operative engagement with the applicator 50 and is provided with a seal such as a flexible web or tape 58. In accordance with the invention, the connection between the tape 58 and the container 56 is such that it absorbs or counteracts any forces, such as shock, which may raise the internal pressure of the processing fluid to such a level that, but for the novel seal, the seal might rupture resulting in unwanted spilling of the fluid and, hence, spoiling of the film 12. Owing to the novel construction, however, release of the fluid can practically occur only by deliberate removal of the tape 58, as described infra.

Figure 2:
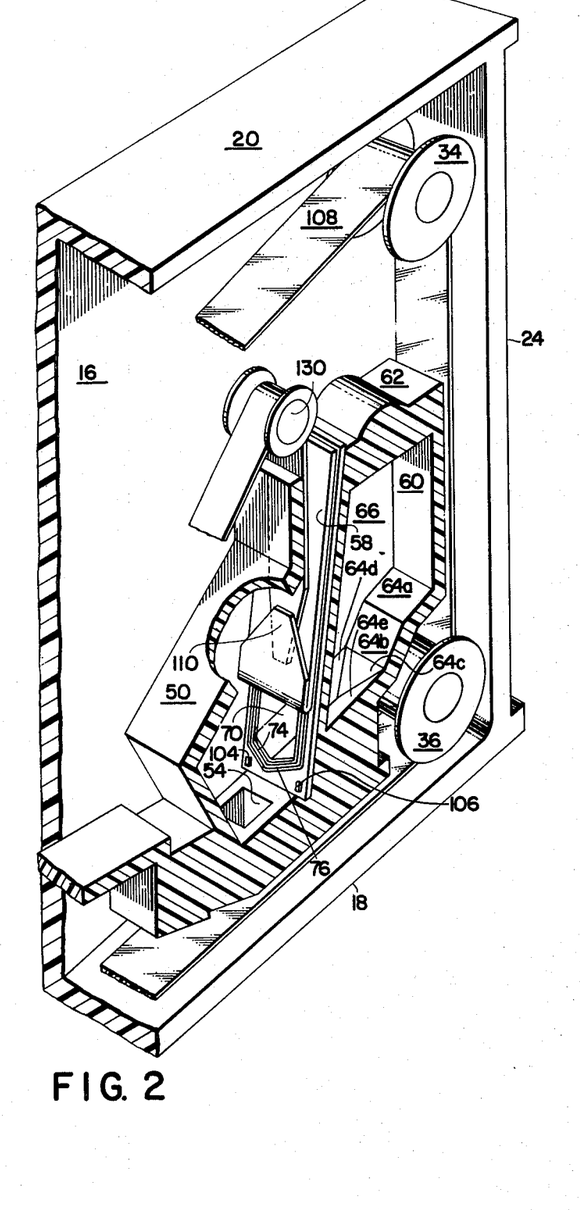
FIG. 2 is a perspective view on an enlarged scale, and partly in section, of the receptacle shown in FIG. 1.
Figures 3, 4, 5:
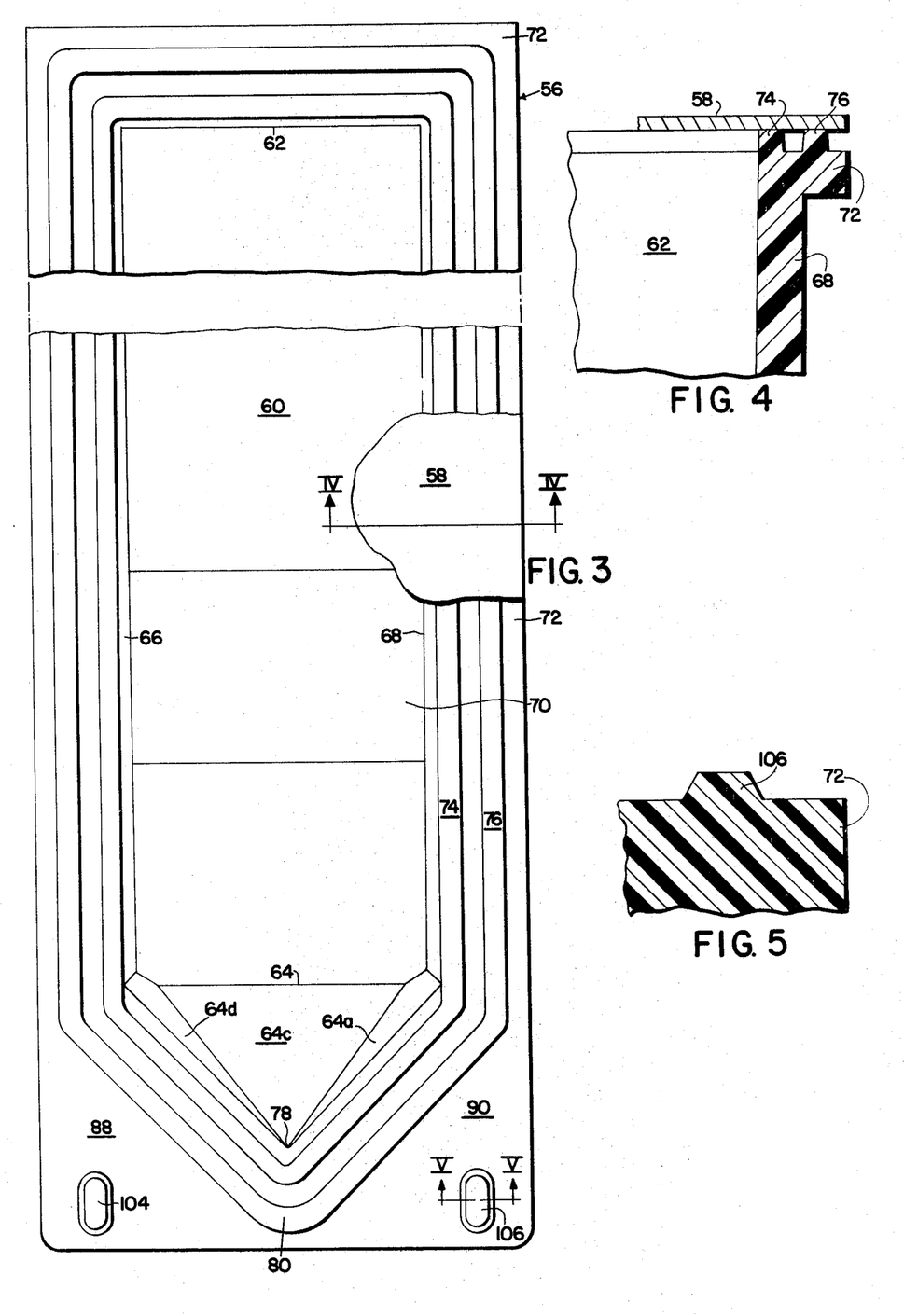
FIG. 3 is a planar view of the receptacle, on a greatly enlarged scale, showing the aperture and sealing lips thereof.
FIG. 4 is an enlarged scale sectional view along line IV—IV of FIG. 3.
FIG. 5 is an enlarged sectional view along line V—V of FIG. 3.

The container 56 comprises a hollow receptacle 56a formed of a bottom wall 60, end wall 62, forward wall 64 as well as opposing side walls 66 and 68. The cavity of the receptacle 56a may be of generally parallelepiped configuration. It may also, as described below, be of rather more complex shape. Opposite bottom wall 60 the container 56 has an aperture 70 which is releasably sealed by the web 58 but which, once the web 58 is removed as described infra, opens into the chamber 52 to release the processing composition into it. The aperture 70, as shown in FIGS. 2 and 3, may be surrounded by a radially extending flange 72 and may be, in an advantageous embodiment of the invention, of chevron or pointed contour (FIGS. 2 and 3). As will be described below, the chevron or pointed contour of the aperture 70 may contribute further to the strength of the seal between the container 56 and the web 58. However, any other aperture contour, such as rectangular, would result in a seal satisfactory for purposes of the invention.

FIGS. 2 and 3 show the aperture 70 surrounded by upstanding lips 74 and 76. While lips 74 and 76 have been shown to protrude from the flange 72 they may, in the absence of a flange, be part of the side, forward, and end walls of the receptacle 56a. The lips 74 and 76 (FIGS. 3 and 4) have a continuous planar upper surface. Preferably they are of equal height, but it would be within the ambit of the invention if they were of different height; for instance, the lip 74 nearest the aperture may be formed slightly higher than the other lip 76.

As shown in the drawings (FIGS. 2 and 3) the lips 74 and 76 are positioned such that they extend in parallel relationship to the contour of the aperture and, hence, to each other. It should be noted, however, that they may also — within the confines of space available — be positioned at random in respect of the aperture as well as of each other. While, as shown, bottom wall 60 and end wall 62 are substantially planar in their surface configuration forward wall 64 is of more complex shape. It comprises five sections 64a, 64b, 64c, 64d and 64e which together with sealing web 58, as described below, define a polyhedral portion of the cavity of the receptacle 56 which has been found further to strengthen the container 56 against rupture which may result from excessive internal pressure of the fluid. As shown, forward wall 64 comprises a first section 64a rising at an obtuse angle from bottom wall 60. Joining section 64a, and extending outwardly therefrom at an obtuse angle, is a further section 64b. Section 64c merging with section 64b at an outwardly extending obtuse angle is of triangular configuration and points away from bottom wall 60. Sections 64a and 64b are directly connected with side walls 66 and 68; connection between section 64c and side walls 66 and 68 is accomplished by sections 64d and 64e. The sections 64d and 64e may be, as shown in FIG. 2, of pentagonal shape. They are symmetrical and equiangularly inclined towards each, and they are joined at one of their edges. Alternately sections 64d and 64e may assume triangular configuration (FIG. 3) connecting section 64c with side walls 66 and 68, respectively, such that they and section 64c merge in a point 78. The configuration of forward wall 64 and side walls 66 and 68 may thus be said generally to resemble the prow of a boat. It has been found that this configuration of the cavity increases the strength of the seal against unintentional rupturing. Thus, it is believed that it breaks up any shock waves in the fluid that may arise when dropping the unit.

Figures 9, 10:
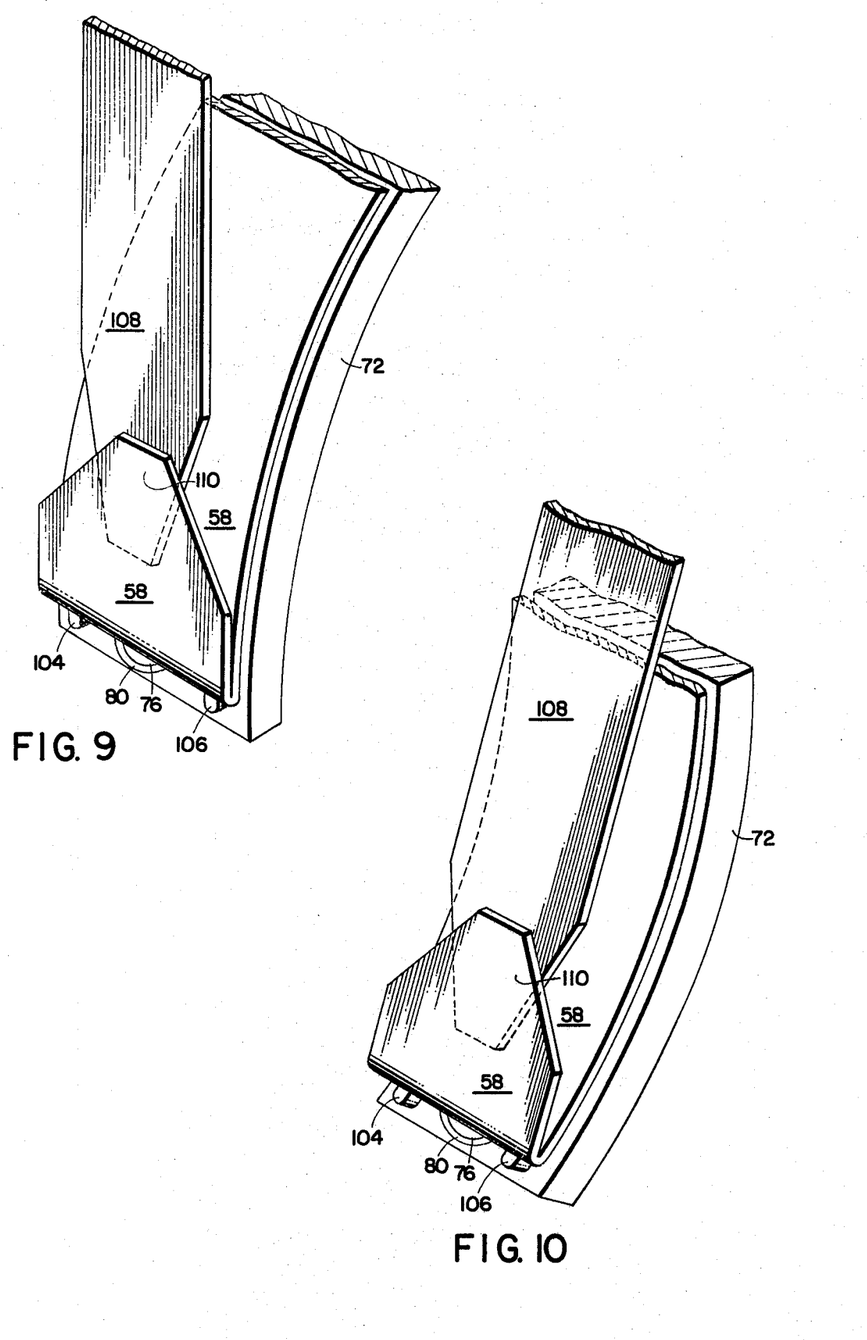
FIG. 9 is a view similar to that of FIG. 6, however, with a flange bent convexly throughout its length.
FIG. 10 is a view similar to that of FIG. 6, though with a flange bent concavely throughout its length.

As may be seen from FIGS. 2 and 3, side walls 66 and 68, and wall 62, and forward wall sections 64d and 64e define an aperture 70 having a generally chevron configuration, i.e., it has one end with a straight edge corresponding to planar end wall 62, and, opposite thereto, a pointed end formed by converging sections 64d and 64e of forward wall 64, side walls 66 and 68 forming straight parallel edges connecting the two ends. The aperture 70 is shown to be surrounded by a planar flange 72 of rectangular contour which extends radially away from the aperture 70. The flange 72 may, however, be convexly or concavely curved as shown in FIGS. 9 and 10. The flange 72 is seen to form a base for a plurality, here two, upward standing lips or ridges 74 and 76.

Lips 74 and 76 protruding from the flange 72 or the top of the walls surrounding the aperture, as the case may be, are positioned parallel to each other and, preferably, relative to the edges of aperture 70. Lip 74 is positioned adjacent the aperture 70, one of its sides being flush with the walls forming the aperture 70 (FIG. 4). Both lips 74 and 76 are generally rectangular in cross section, but may also, as shown in FIG. 4, assume slightly truncated cross-sectional configuration. Lip 76 is placed inwardly of the outer margin of flange 72 and extends in parallel relationship thereto except in the area of the converging forward wall sections 64d and 64e. In this area, it follows the direction of lip 74.

Each of the two generally triangular sections 88 and 90 of flange 72, constituted generally by the lip 76 and the outer margin of the flange 72, is provided with one protrusion 104 and 106 of oblong planar section and, as shown in FIG. 5, somewhat truncated cross section. These protrusions may also be of rectangular cross section (not shown). As shown in the drawings, the protrusions 104 and 106 are positioned on the flange 72 so that a line intersecting them also intersects a point of convergence 80 of the outer lip 76. The protrusions 104 and 106 are of even height and may have the same height as either or both of the lips 74 and 76. Lips 74 and 76 as well as protrusions 104 and 106 are integral with the flange 72 which, in turn, is of one piece construction with the container 56.

It should be noted that in the case, referred to above, in which the aperture 70 assumes a rectangular, rather than a chevron, contour with the lips following, in their respective orientations, this rectangularity, there may be no protrusions such as 104 and 106.

Figure 6:
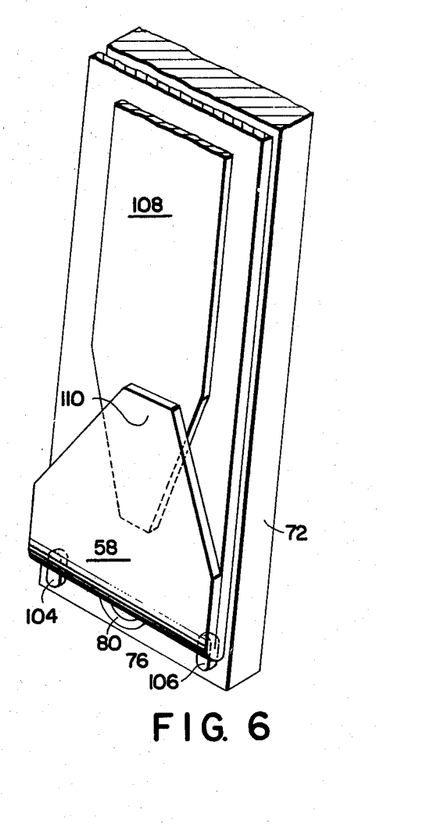
FIG. 6 is a perspective view on an enlarged scale of the flange surrounding the aperture of novel receptacle with its sealing tape at the beginning of the peeling action.

The function of the lips 74 and 76 is to provide a sealing connection between the container 56 and the web or tape 58 as shown in FIGS. 2, 4 and 6. The web 58 may be of impermeable material, inert to the processing liquid, such as leaded plastic. The seal between the web 58 and the lips 74 and 76 may be brought about by heat fusion, by high frequency welding, adhesive, or any other method known in the art and should be of sufficient strength to prevent rupturing except by pulling force deliberately exerted on the web 58. The web 58 is also releasably bonded to the protrusions 104 and 106.

Preferably, the container 56 is injection molded and is made of material such as polyethylene, polyurethane, or the like, which is inert to the processing fluid. It is, of course, possible also to make the receptacle 56 by stamping or extruding suitable sheet metal.

It has been found that the sealing arrangement described and including a plurality of lips, such as two, to which the sealing web is attached offers significant advantages relative to prior art devices which depended upon direct bonding of the tape to an uninterrupted surface such as a flange surrounding an aperture. More particularly, the advantage of the novel seal is seen in the reduction of the area of bonded interface between web and receptacle without reducing the "dropstrength" of the bond. That is to say, the novel sealing arrangement is substantially as resistant against unwanted rupture as may result when the device is inadvertently subjected to shock resulting from falling or the like as prior art devices having a markedly larger bonding area. On the other hand, however, owing to this reduced bonding area the forces required to bring about deliberate separation of the sealing web from the receptacle in the manner described infra can be reduced or, commensurately, be exerted to assure proper separation without tearing of the web or causing damage to the means exerting these forces. It should be noted especially that these advantages result irrespective of the shape or contour of the aperture and corresponding layout of the lips surrounding the aperture.

There are provided in the cassette 10 means for selectively and deliberately severing the sealing web 58 from the container 56 by peeling it off the protrusions 104 and 106 and, commencing at the point of convergence 80 formed by the lip 76 in the area of the point of intersection 78, off the lips 74 and 76 (FIGS. 6–10). To this end, the sealing web 58 is attached at its lower end, as seen in FIGS. 1 and 2, to an extension or draw tongue 108 comprising a flexible tape. One end of the tongue 108 may be releasably fastened to the sealing web 58, as at 110, the other end being connected to an actuating lever 112 (FIG. 1). The lever 112 is generally U-shaped and is provided with flaring extensions 114 and 116. The knee of lever 112 is mounted for limited rotation about the hub 30 of supply reel 26. Extension 114 is fastened to the draw tongue 108, and extension 116 is connected to a link 118, the latter being adapted to cause rotation of the lever 112 in a direction affecting peeling of sealing web 58 off the lips 74 and 76.

The link 118 is rigidly mounted on a stub 120 which is in the side wall 16 mounted for axial displacement. The axial displacement of the stub 120 is accomplished by transducing means provided in the projector (not shown) and which is actuated at a time when sensors in the projector signal that the cassette 10 is in a state requiring processing of the film 12. The sensors may be controlled by or respond to, physical irregularities, such as hooks or protrusions, deliberately provided at or near one or both ends of the film 12 so that when the irregularity engages a sensor as for instance a channel guide 122 provided in the cassette 10, the transducing means which are in contact with the sensor 122 cause the stub 120 with the attached link 118 to be pushed away from the side wall 16.

As shown in FIG. 1, the periphery of reel 26 is provided with a plurality of camming surfaces 124 each ending in an abrupt step 126. While when the stub 120 is in its retracted position, the reel 26 may rotate freely, forward movement of the stub 120 will result in a cam follower 128 secured to the end of lever extension 116 to be pushed into the rotational path of reel 26, thereby engaging one of the steps 126. This, in turn, will cause the lever 112 to be pivoted in a clockwise direction when the reel 26 subsequent to the forward thrust of stub 120 is rotated in that direction. In so doing, the lever 112 is disconnected from the link 118. The pivoting of the lever 112 causes the extension 108 to be moved downwardly as seen in FIG. 1, and the sealing web 58 to be moved upwardly, the upward motion being the result of the extension 108 passing around an idler roll 130 journaled on side wall 16. The sealing web 58 is thus peeled off the protrusions 104 and 106 and, due to the point of convergence 80 of lip 76 at a locus intersected by a line extending through both protrusions 104 and 106, the sealing web 58 commences at substantially the same time to be peeled off the lips 74 and 76 in a gradually widening pattern until those sections of the lips 74 and 76 are reached which extend in parallel to the parallel edges of side walls 66 and 68 of the receptacle 56. If the aperture is of rectangular contour (not shown) with lips surrounding it in parallel relationship, initial separation would take place at the outer lip along its entire length positioned normal to the direction of pulling force exerted on the web 58. Separation would thereafter continue along the two parts of the lips extending in parallel to the pulling force; thereafter it would take place at the inner lip in like manner. It is to be noted that owing to the narrow width of the lips, the force required to affect separation would be relatively minor by comparison to sealing arrangements in which the web is bonded to the entrie surface of a flange surrounding the aperture of a receptacle.

As may be seen in the drawings, FIGS. 1 and 2, the surfaces of the film 12, the draw tongue 108, and the sealing web 58, as seen in a direction normal to their respective longitudinal axes, extend at right angles to, and intersect, a plane substantially coincident with, or at least in parallel position to, these longitudinal axes. In this respect, it is important to note that the point of convergence 80 of the lips 74 and 76 also lies in this plane, and that the side walls 66 and 68 and, hence, the parallel edges of the aperture 94 formed by side walls 66 and 68 are positioned on either side of, and in parallel to, this plane. It is this spatial relationship that adds a further advantage to the receptacle described herein, in that it assures severance of the web 58 from the lips 74 and 76 commencing at their point of convergence 80 and from there gradually to those sections of the lips which are positioned in parallel to the longitudinal axis of the web 58.

As will be appreciated by those skilled in the art, the force required initially to peel the sealing strip 58 off the protrusions 104 and 106 as well as the point of convergence of lips 74 and 76 is less than if the strip 58 had to be severed lips extending normal to the direction of pulling force exerted on tape 58. Therefore, the impact of the initial pulling force can be absorbed in the three areas of initial peeling action and is then gradually spread out by the lips flaring away from their point of convergence 80.

The lips 74 and 76, as shown in FIG. 3, have uniform width throughout their entire length. It has been found, however, that variations in the width of the lips may yield specific advantages in respect of the separation of the web 58 from the receptacle 56. Alternates of lip configurations are shown, by way of example, in FIGS. 7 and 8.

Figure 7:
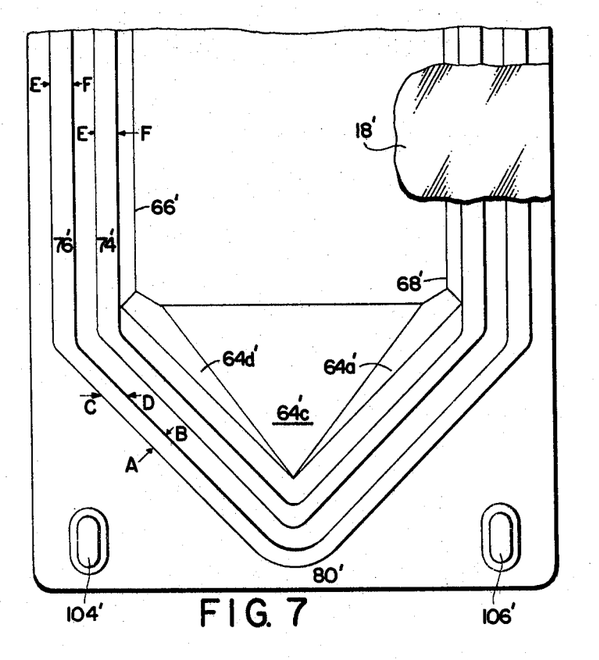
FIG. 7 is a sectional planar view of the flange surrounding the aperture of the receptacle with an alternate sealing lip configuration.

Thus, as shown in FIG. 7, lips 74' and 76' are of uniform width E-F within the confines of side walls 66' and 68'. They are, however, of reduced width in the region of their convergence, adjacent forward wall sections 64d' and 64e'. Preferably, and as shown, their width AB is such that a line CD intersecting them in a direction normal to the longitudinal axis of the aperture 94' is equal in length to the width E-F of the lips 74', 76'. In other words $$EF = CD = \sqrt{AB^2 + AC^2}$$

Such an embodiment offers the advantage that the force required to separate the tape 58' from the lips 74', 76' is substantially uniform along the entire length of the aperture.

Figure 8:
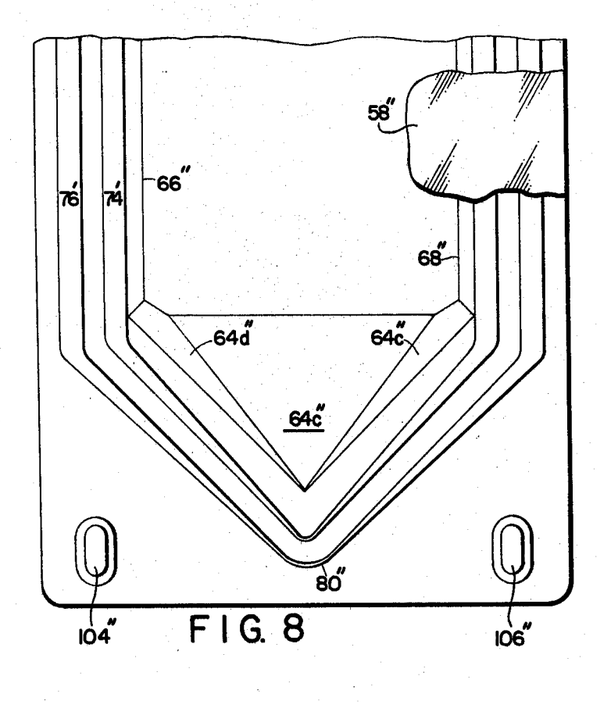
FIG. 8 is a view similar to that of FIG. 7 with yet another form of sealing lips.

FIG. 8 shows yet another embodiment of the invention. As here depicted the lips 74", 76", while of uniform width in their area adjacent side walls 66" and 68", gradually diminish in width, being narrowest adjacent their point of convergence 80". Such lip configuration allows for an initially relatively weak force to separate the tape 58" from the lips 74", 76". As will be apparent to those skilled in the art, the greatest and, hence, most critical force required to break the bond between the sealing tape 58" and the lips 74" and 76" (or 74, 76 and 74', 76') is concentrated at the site of initial separation. By rendering this site as small as possible, as by the diminishing diameter of the lips as shown in FIG. 8, the initial force required for sealing strip separation is substantially reduced. Preferably the diminishing diameter, or width, of the lips 74" and 76" is such that the initial force required for separation of the web 58" at the point of convergence 80" is equal to, but not greater than, the force required to separate the web 58" from the remainder of the lips, and the angle at which the thickness of the lips 74" and 76" is reduced may be such that the pulling force exerted on the tape 58" may be rendered gradually increasing from initiation of the separation to a maximum in the area where the lips 74" and 76" extend in parallel on both sides of the aperture 70".

While, as herein disclosed, the receptacle has a flange provided with two lips, it is fully within the ambit of the invention to provide more than two lips. Those skilled in the art will realize that the invention is not restricted to the disclosed embodiment and that variations thereof are fully within its ambit.

What is claimed is:

1. A motion picture film cassette comprising:
a housing;
an elongated strip of photographic film;
an applicator for applying a photographic processing composition to said film strip, said applicator including means for defining a chamber having a nozzle for dispensing said processing composition from said chamber onto said film strip and a releasably sealed container for initially storing said processing composition, said container comprising an open sided receptacle having a peripheral wall portion extending around and defining its opening, and a flexible web releasably bonded to said peripheral wall portion whereby a portion of said web serves as a sealing cover over said opening to initially retain the processing fluid in said container, said web being provided with an extension for purposes of selectively peeling said web progressively away from said peripheral wall portion of said container to effect the release of the processing composition from said container, said chamber being positioned to receive the processing fluid from said container when it is so released;
means for causing said extension of said web to fold back over said portion of said web and actuable for selectively exerting a pulling force on said extension of said web in a direction causing said fold to move across said receptacle to peel said web away from said receptacle whereby the processing fluid is released from said container into said chamber; and
means for progressively advancing said film strip across said nozzle to facilitate the formation of a coating of processing composition thereon, said peripheral wall portion of said receptacle being configured to present two spaced apart continuous surfaces each extending around said receptacle to face outwardly of its said opening and bonded to said portion of said flexible web, the width of each said surface representing a substantial and significant portion of the combined width of said surfaces, the combined width of said surfaces being selected to permit said web to be peeled away from said receptacle responsive to a predetermined minimum force exerted on said web extension, said cassette being thus able to undergo greater shocking without complete rupture of said bond between said portion of said web and said surfaces than would be possible if said web were bonded to the same width of surface configured as a single uninterrupted surface.

2. The cassette of claim 1 wherein said two spaced apart continuous surfaces of said receptacle are of substantially equal width.

3. The cassette of claim 1 wherein said two spaced apart continuous surfaces of said receptacle define respective points of convergence adjacent said fold in said extension of said flexible web.

4. The cassette of claim 1 wherein said spaced apart continuous surfaces of said receptacle define respective points of convergence and said receptacle additionally includes a pair of protrusions spaced apart to be respectively disposed on opposite sides of said points of convergence intermediate said receptacle opening and said fold in said web, each of said protrusions defining an outwardly facing surface, of substantially small area relative to the area of either of said spaced apart continuous surfaces of said receptacle which is also bonded to said flexible web.

5. The cassette of claim 1 wherein said surfaces respectively define closely spaced apart points of convergence, and said receptacle includes a plurality of forward wall portions inclined with respect to each other and with respect to said points of convergence to provide said receptacle with a boat prow like configuration adjacent said points of convergence.

6. A motion picture film cassette comprising:

a housing;

an elongated strip of photographic film;

an applicator for applying a photographic processing composition to said film strip, said applicator including means for defining a chamber having a nozzle for dispensing said processing composition from said chamber onto said film strip and a releasably sealed container for initially storing said processing composition, said container comprising an open sided receptacle having a peripheral wall portion extending around and defining its opening, and a flexible web releasably bonded to said peripheral wall portion whereby a portion of said web serves as a sealing cover over said opening to initially retain the processing fluid in said container, said web being provided with an extension for purposes of selectively peeling said web progressively away from said peripheral wall portion of said container to effect the release of the processing composition from said container, said chamber being positioned to receive the processing fluid from said container when it is so released;

means for causing said extension of said web to fold back over said portion of said web and actuable for selectively exerting a pulling force on said extension of said web in a direction causing said fold to move across said receptacle to peel said web away from said receptacle whereby the processing fluid is released from said container into said chamber; and means for progressively advancing said film strip across said nozzle to facilitate the formation of a coating and processing composition thereon, said peripheral wall portion being configured to present at least one continuous surface extending around said receptacle opening to face outwardly of said opening and bonded to said flexible web, said surface defining a point of convergence, said receptacle including a pair of protrusions spaced apart to be respectively disposed on opposite sides of said point of convergence, each of said protrusions defining an outwardly facing surface, of substantially small area relative to the area of said one continuous surface of said receptacle, which is bonded to said web extension.

* * * * *